United States Patent [19]
Sekiguchi et al.

[11] Patent Number: 5,724,860
[45] Date of Patent: Mar. 10, 1998

[54] CAM FIXING CONSTRUCTION FOR CAM SHAFT

[75] Inventors: Hideo Sekiguchi, Mikata; Akihiko Matsuoka, Iwata; Seiji Sato, Mie-ken; Shosaku Chiba, Niiza; Hiroshi Kasai, Tokyo-to, all of Japan

[73] Assignees: NTN Corporation, Osaka; Honda Giken Kabushiki Kaisha, Tokyo, both of Japan

[21] Appl. No.: 640,315

[22] Filed: Apr. 30, 1996

[30] Foreign Application Priority Data

May 10, 1995 [JP] Japan ................... 7-112047

[51] Int. Cl.$^6$ .................................................. F01L 1/04
[52] U.S. Cl. ........................ 74/567; 123/90.6; 29/888.1
[58] Field of Search ........................... 74/567; 123/90.6; 425/264, 425; 29/888.1

[56] References Cited

U.S. PATENT DOCUMENTS

| | | | |
|---|---|---|---|
| 4,977,793 | 12/1990 | Husted | 123/90.6 X |
| 5,009,123 | 4/1991 | Hiraoka et al. | 74/567 |
| 5,431,131 | 7/1995 | Kuhn et al. | 123/90.6 |

FOREIGN PATENT DOCUMENTS

| | | | |
|---|---|---|---|
| 56-39356 | 4/1981 | Japan | 74/567 |
| 61-88003 | 6/1986 | Japan . | |
| 62-72407 | 5/1987 | Japan . | |
| 6-159477 | 6/1994 | Japan | 74/567 |
| 1587295 | 8/1990 | U.S.S.R. | 74/567 |
| 1115093 | 5/1968 | United Kingdom | 74/567 |

Primary Examiner—Rodney H. Bonck
Assistant Examiner—Saúl J. Rodriguez
Attorney, Agent, or Firm—Nikaido, Marmelstein, Murray & Oram LLP

[57] ABSTRACT

A cam shaft having a cam piece disposed on a locking member or plurality of locking members provided on a shaft at predetermined positions. A recess or recesses formed in the cam piece align with and engage the locking members disposed on the shaft. The cam piece is secured to the shaft by a resin injected into and around the recess such that the cam piece is integrally fixed on the shaft when the resin hardens.

4 Claims, 5 Drawing Sheets

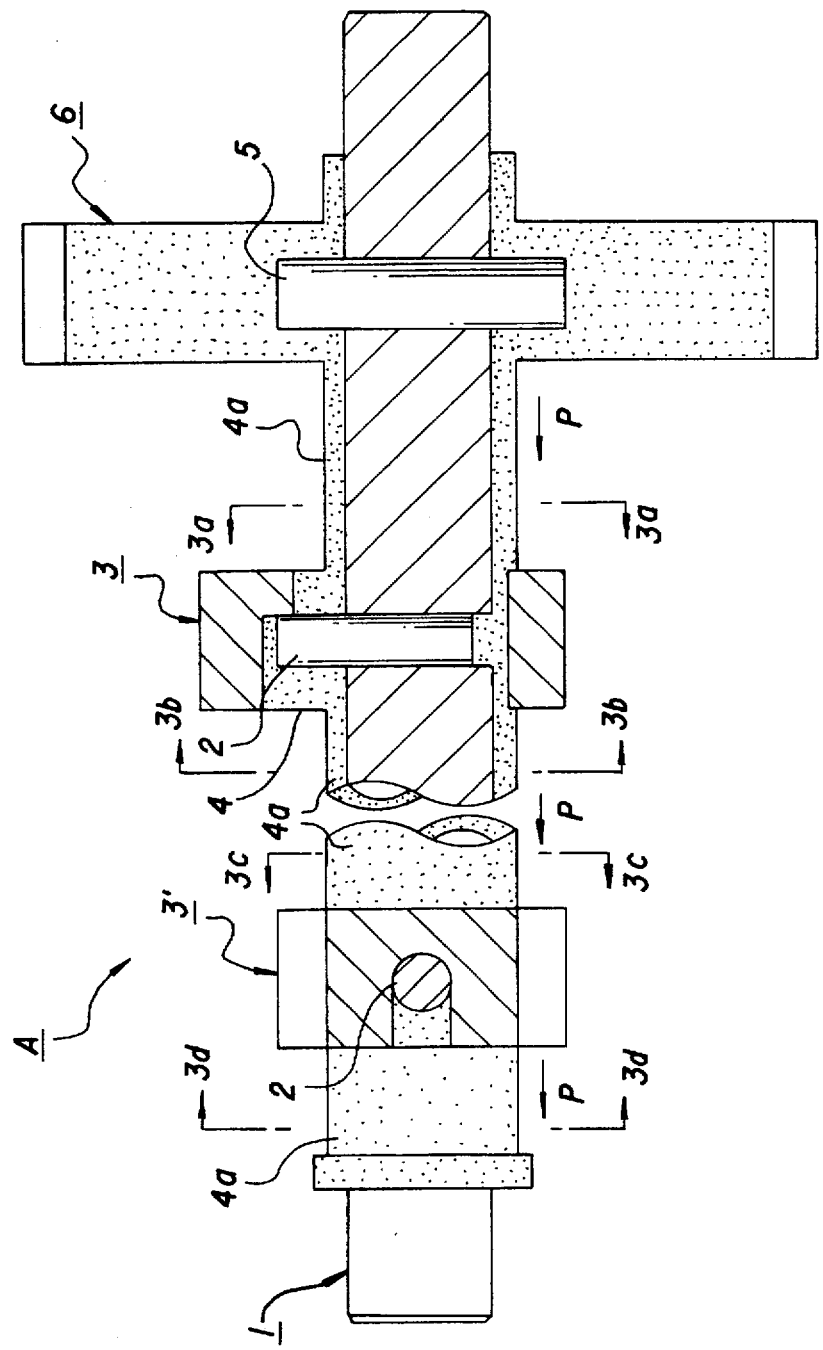

CAM FIXING CONSTRUCTION FOR CAM SHAFT

BACKGROUND OF THE INVENTION

The present invention relates to a cam fixing construction for a cam shaft used for controlling the opening and closing the suction and exhaust valves of an internal combustion engine.

A cam shaft used in an internal combustion engine has at least two cams provided thereon for controlling the opening and closing of the suction and exhaust valves. In this connection, there is known a construction in which for simplification of the manufacturing process, cam portions (cam pieces) are produced separately from the cam shaft and then integrally fixed on the cam shaft.

For example, in integrally molding cam gears of synthetic resin on the outer periphery of the shaft, molten resin is supplied also to the fixing portions of the cam pieces within the mold, thereby fixing the cam pieces in the axial and rotative directions with respect to the shaft, such construction being disclosed in Japanese Utility Model unexamined publications 61-88003 and 62-72407.

Since the cams on the cam shaft should accurately control the opening and closing of the suction and exhaust valves in timed relation to the engine cycle, their positional relation to the shaft is very important.

In this respect, the conventional construction described above requires that the positioning of the cam pieces with respect to the cam shaft be made in the mold, so that it causes the inconveniences, such as hight accuracy in the mold is necessary and splitting the mold is complex.

Furthermore, separate molds have to be prepared according to differences in the profile and phase angle of the cam pieces, a fact which is disadvantageous from the standpoints of mold design, manufacture, maintenance, setups and changeovers, and cost. Further, since the construction is such that the transmission of torque from the cam shaft to the cam pieces is effected through a resin molding, it is difficult to cope with a situation in which further reliability of torque transmission is required according to usage conditions. Further, it is necessary to form a spiral groove (Japanese Patent publication Jitsuyo Kokai 61-88003) or a key way (Japanese Patent Publication Jitsuyo Kokai 62-72407) in the outer periphery of a shaft within a mold as a passage for leading molten resin to the fixing portions of cam pieces, a fact which leads to complication and increased diameter of the shaft construction.

SUMMARY OF THE INVENTION

Accordingly, the present invention is intended to provide a cam fixing construction which is capable of (1) accurately positioning the cam pieces on the shaft without resorting to the mold, (2) making more reliable the transmission of torque from the shaft to the cam pieces, and (3) simplifying the shaft construction and minimizing the shaft diameter.

A cam fixing construction for a cam shaft according to the invention comprises a locking member disposed at a predetermined position on a shaft, a cam piece having a recess fit to the locking member in one end surface thereof and being mounted on an outer periphery of the shaft with fitting the recess to the locking member, and a resin molding charged into a space defined between the recess of the cam and the outer periphery of the shaft.

Further, in the arrangement, the cam piece has a clearance communicating with the recess and the opposite end surfaces thereof, the resin molding being charged into said space through the clearance.

The locking member may be formed integral with the shaft, but it is preferable to erect a metal pin erected on the shaft at a predetermined position.

Further, fixing portions each comprising a locking member, a recess and a resin molding may be provided at a plurality of places in the rotative direction. In this case, the metal pin may be diametrically extended through the shaft at predetermined positions, so that the opposite ends of the metal pin serve to provide locking members, and corresponding to said two locking members, fixing portions may be disposed at two circumferentially equispaced positions.

When the cam piece is slid onto the shaft with the recess thereof fitted on the locking member, this determines the positions of the cam piece in the axial and rotative directions with respect to the shaft. Therefore, the positioning of the cam piece can be accurately and simply effected without resorting to the mold.

When the molten resin charged into the space between the recess of the cam piece and the outer periphery of the shaft solidifies to form a resin molding, the cam piece is fixed in position in the axial and rotative directions. That is, the cam piece is restrained with respect to the shaft, from moving in one axial direction by the bottom wall of the recess and the metal pin, from moving in the other axial direction by the engagement between the engagement between the resin molding and the metal pin, and from rotating clockwise and counterclockwise by the engagement between the opposite lateral walls of the recess and the metal pin. Further, the transmission of torque from the shaft to the cam piece is effected through the area of contact between the lateral wall of the recess and the metal pin.

The clearance in the cam piece is the portion which defines the passage for the flow of molten resin during molding. Molten resin flowing from one (or the other) of the cam pieces into the clearance also flows into the recess communicating with the clearance. Therefore, the key way or spiral groove heretofore formed in the shaft to secure the flow of molten resin in the mold is no longer necessary.

BRIEF DESCRIPTION OF THE DRAWINGS

FIG. 1 is a longitudinal sectional view of a cam shaft according to the present invention;

FIG. 2 is a longitudinal sectional view (FIG. a) showing the periphery of a cam piece in FIG. 1, and a cross sectional view (FIG. b) along the line b—b in FIG. a;

FIG. 4 is a front view (FIG. a) of the cam piece in FIG. 2, and a cross-sectional view (FIG. b) taken along the line b—b in FIG. a;

FIG. 6 is a longitudinal sectional view (FIG. a) showing the periphery of a cam piece according to another embodiment of the invention, and a cross-sectional view (FIG. b) taken along the line b—b in FIG. a.

DESCRIPTION OF THE PREFERRED EMBODIMENTS

Embodiments of the invention will now be described with reference to the drawings.

Figure 2A:
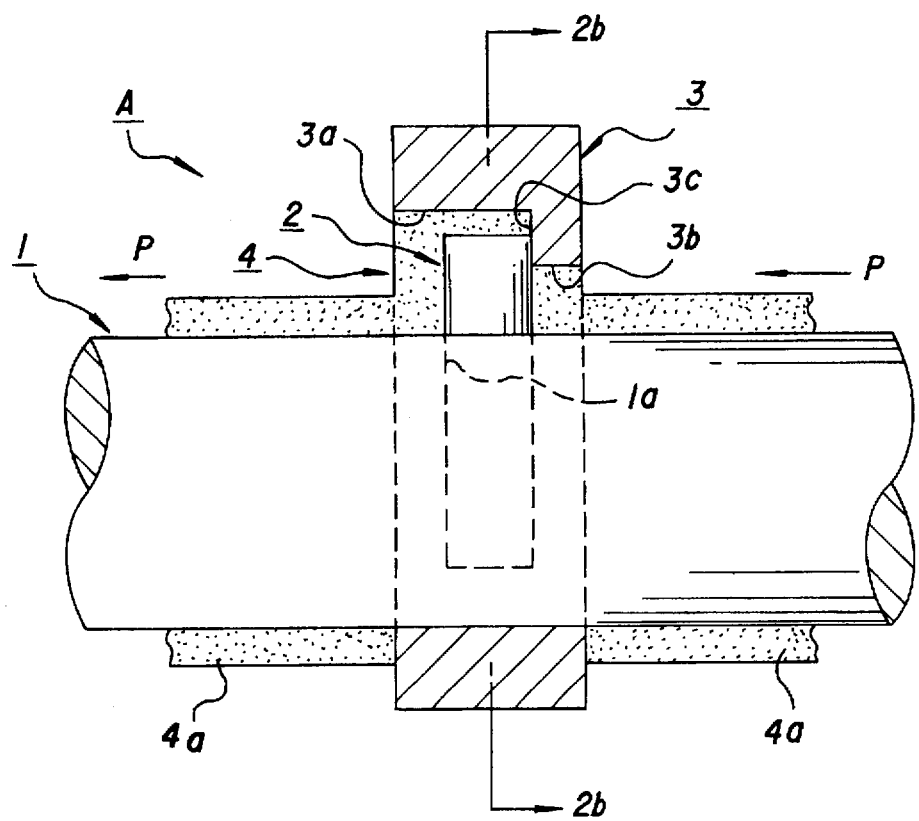
Figure 2B:
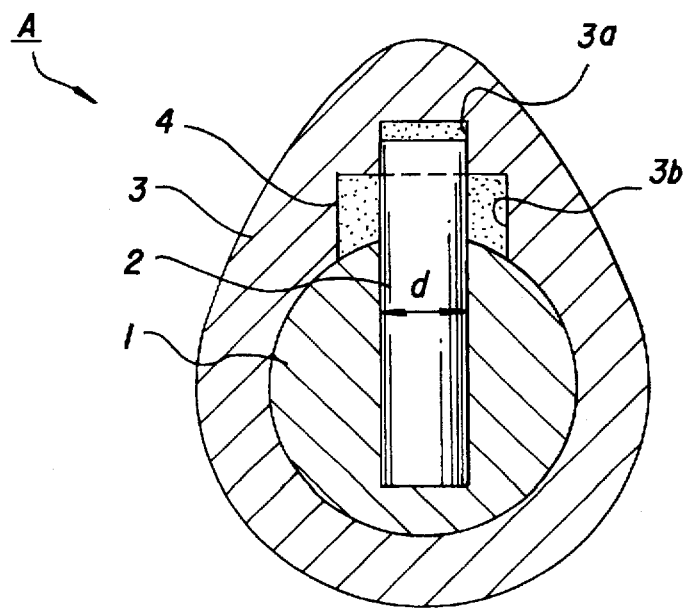
Figure 3A:
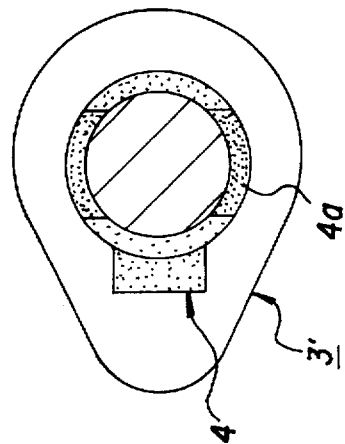
FIG. 3 is a cross-sectional view of the cam shaft in FIG. 1 (FIG. a: a section taken along the line m—m, FIG. b: a section taken along the line n—n, FIG. c: a section taken along the line p—p, FIG. d: a section taken along the line q—q)
Figure 3C:
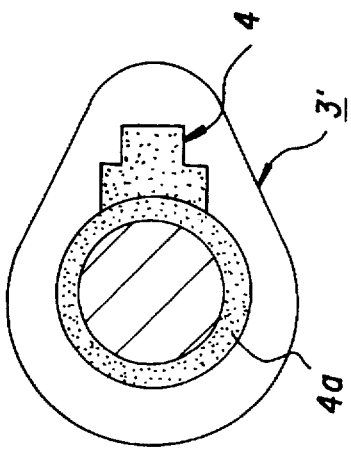
Figure 3B:
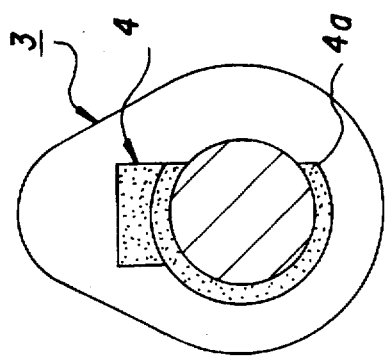
Figure 3D:
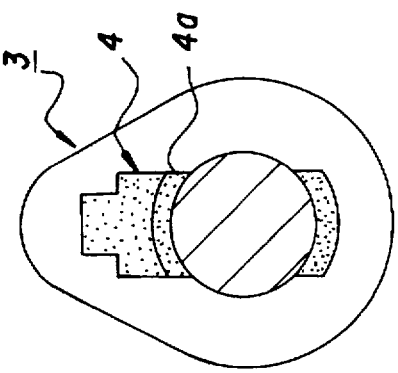

FIG. 1 shows the overall arrangement of a cam shaft A according to an embodiment. FIG. 2 shows the shaft periphery of the cam shaft A, and FIG. 3 shows a cross-section of a predetermined portion of the cam shaft A. The cam shaft A is designed for being assembled, e.g., into a air-cooled 4-cycle engine for a generator or weed cutting machine, and comprises a shaft 1, a cam piece 3 for suction or exhaust purposes and a cam piece 3' for exhaust or suction purposes which are integrally fixed on the outer periphery of the shaft 1, and a cam gear 6 of resin integrally molded on the outer periphery of the shaft 1. The cam pieces 3 and 3' are out of phase with respect to each other by a predetermined amount (phase angle). In addition, in this embodiment, an arrangement is employed in which the fixing of the cam gear in the axial and rotative directions with respect to the shaft 1 is attained by a metal pin 5 fitted in the shaft 1.

As shown enlarged in FIG. 2 (while FIG. 2 shows the periphery of the cam piece 3, the periphery of the cam piece 3' is of the same arrangement), a metal pin 2 serving as a locking member is installed in a predetermined position on the shaft 1. The cam piece 3 is mounted on the shaft 1 in such a manner that a recess 3a formed in one end surface of the cam piece 3 is fitted on the metal pin 2, and then is integrally fixed to the shaft 1 by a resin molding 4. The locking member may be integrally formed on a predetermined position on the outer periphery of the shaft 1; however, in this embodiment, an arrangement is employed in which a radial blind hole 1a is formed at a predetermined position in the shaft 1 and one end of the metal pin 2 is fitted in said blind hole 1a. The other end of the metal pin 2 projecting radially outward from the outer periphery of the shaft 1 serves as a locking member. The materials of the shaft 1 and metal pin 2 may be suitably selected from among metallic materials; for example, ferrous materials such as a machine carbon steel whose carbon content is about 0.15–0.55% by weight, and cast iron may be used. Further, in order to improve the fixing strength and the transmission of torque between the shaft 1 and cam piece 3, carburizing, high frequency hardening, soft-nitriding or the like treatment may be applied to the metal pin 2. Further, for proper hardness, both the shaft 1 and the metal pin 2 may be formed of a carbon steel whose carbon content is about 0.15–1.1% by weight, preferably about 0.3–0.5% by weight. In addition, the locking member is not limited to a round pin, such as the metal pin 2, and may be a pin of square or othershape.

Figure 4A:
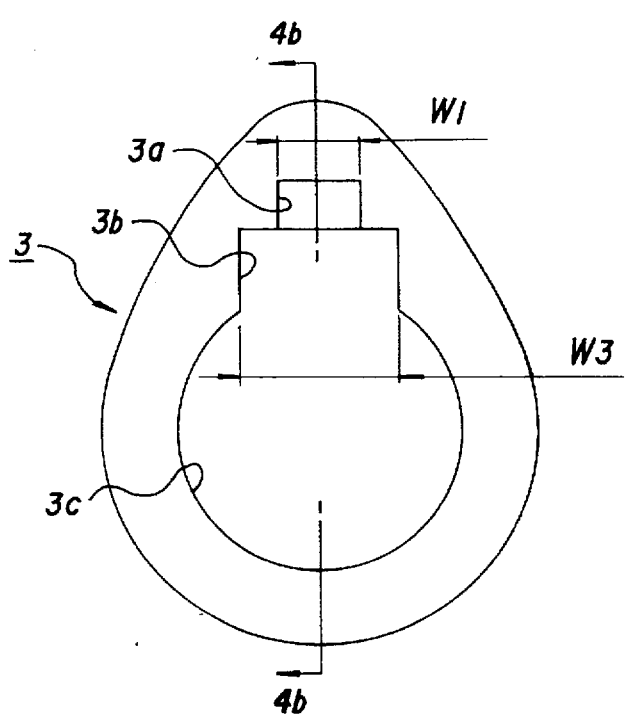
Figure 4B:
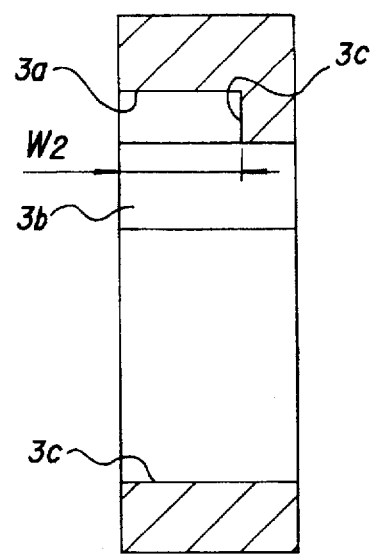

The cam piece 3 (and the cam piece 3' alike) is molded into a predetermined shape by using a metallic material having a high wear resistance, such as sintered metal, ceramic material, or one of the various resins to be later described. As shown in FIG. 4, it comprises a square recess 3a axially extending from one end surface over a distance halfway across the width, and a square clearance 3b axially extending from one end surface to the other. The recess 3a is positioned on the inner diameter side of the cam nose and the clearance 3b is positioned on the inner diameter side of the recess 3a, the recess 3a and the clearance 3b communicating with each other. Further, the width W1 of the recess 3a is such that it fits on the metal pin 2, and the depth W2 of the recess 3a and the width W3 of the clearance 3b are greater than the diameter d of the metal pin 2. In addition, the inner diameter 3c of the cam piece 3 is such that it fits on the shaft 1 with a fit clearance therebetween.

In fixing the cam piece 3 on the shaft 1, first, the cam piece 3 is fitted on the shaft 1 from the shaft end and slid to the position where the metal pin 2 is erected. And the recess 3a is fitted on the metal pin 2 and thrusted until it abuts against the outer periphery of the metal pin 2. In this manner, when the metal pin 2 has been perfectly fitted in the recess 3a, the abutment between the bottom wall 3c of the recess 3a and the metal pin 2 determines the axial position of the cam piece 3 relative to the shaft 1 and simultaneously therewith the abutment between the opposite lateral walls of the recess 3a and the metal pin 2 determines the rotative position of the cam piece 3 relative to the shaft 1.

Then, the shaft 1 having the cam piece 3 (and cam piece 3') mounted thereon at a predetermined position in the manner described above is set in a mold, and molten resin is charged into the space defined between the recess 3a of the cam piece 3 and the outer periphery of the shaft 1. In the stage prior to the setting in the mold, the positioning of the cam piece 3 relative to the shaft 1 has been effected; therefore, inconveniences, such as more sophistication of the mold than is necessary, and the complexity involved in splitting the mold, as in the prior art, are avoided. Further, even for a cam piece which differs in cam profile and phase angle, accurate positioning can be attained by using the same mold rather than changing the latter.

Since the cam piece 3 in this embodiment has a clearance 3b, molten resin can be charged into the fixing portions of the cam pieces 3 and 3' (and the molding portion of the cam gear 6) by providing one cavity and one gate in the mold and pressure-pouring molten resin into the cavity from said one gate. For example, in FIGS. 1 and 2a, the molten resin P pressure-poured into the cavity in the mold from an unillustrated gate flows in the direction of arrow from the cavity space of the cam gear6 to the cylindrical (or partially cylindrical) cavity space defined around the outer periphery of the shaft 1, flowing from the other end surface of the cam piece 3 into the clearance 3b. And the molten resin P flowing into the clearance 3b flows into the recess 3a through passage spaces defined between the metal pin 2 and the opposite lateral walls of the clearance 3b (said passage spaces being defined since the width W3 of the clearance 3b is greater than the diameter d of the metal pin 2), and also into the cylindrical (or partially cylindrical) cavity space from one end surface of the cam piece 3 through the clearance 3b. And it flows in the direction of arrow through the cylindrical (or partially cylindrical) cavity space and in the fixing portion of the cam piece 3' in the manner described above, until it enters the terminal end of the cavity space.

As described above, since the cam piece 3 in this embodiment has the clearance 3b communicating both with the recess 3a and with the opposite end surfaces thereof, the fixing portions of a plurality of cam pieces 3 can be charged with molten resin simply by providing a mold with one cavity and one gate. Therefore, the construction of the mold can be simplified, dispensing with the key way and spiral groove which have been formed in the shaft in order to obtain the flow of molten resin within the mold, thus achieving an increase in the strength of the shaft, a reduction in the shaft diameter, and simplification of the processing of the shaft, all these leading to a reduction in cost. Further, as shown in FIG. 3, the connecting portions 4a of the resin molding 4 between the cam gear 6 and the cam piece 3 and between the cam pieces 3 and 3' can be made partially cylindrical throughout said region or in a portion of said region, thereby avoiding interference with the peripheral members, reducing the weight, and saving the resin material.

Thus, when the molten resin P charged into the space between the recess 3a of the cam piece 3 and the outer periphery of the shaft 1 has solidified to form the resin molding 4, the cam piece 3 is fixed in the axial and rotative directions with respect to the shaft 1. That is, in FIG. 2, the cam piece 3 is restrained with respect to the shaft 1, from moving axially leftward by the engagement between the bottom wall 3c of the recess 3a and the metal pin 2, from moving axially rightward by the engagement between the resin molding 4 and the metal pin 2, and from rotating clockwise and counterclockwise by the engagement between the opposite lateral walls of the recess 3a and the metal pin 2. Further, since the transmission of torque from the shaft 1 to the cam piece 3 is effected through the area of contact between the metal pin 2 and the lateral wall of the recess 3a, torque transmission is more reliable than in the case of the conventional construction using a resin molding as an intermediary. Further, in this embodiment, since the connecting portions 4a of the cylindrical (or partially cylindrical) resin molding 4 are integrally formed on the opposite end surfaces of the cam piece 3, the fixing force in the axially opposite sides of the cam piece 3 is high.

When the cam gear 6 is to be molded of resin as in the case of this embodiment, a cavity space {which communicates with the fixing portions of the cam pieces 3, 3' through a cylindrical (or partially cylindrical) cavity space} corresponding to the shape of the cam gear 6 is defined in the molding portion, and molten resin is pressure-poured thereinto through one gate (or a plurality of gates), whereby the resin molding 4 for fixing the cam gear 6 and the plurality of cam pieces 3, 3' can be simultaneously formed. The position at which the gate is to be provided is not particularly limited, but preferably it is provided in the vicinity of the cavity space of the cam gear 6, so that the molten resin P flows from the cam gear 6 to the opposite ends of the shaft 1 (in the direction of arrow in FIGS. 1 and 2a), which measure is advantageous in enssring accuracy of the cam gear 6 and in preventing the positional deviation of the cam piece 3 under the pressure of flow of the molten resin P. Further, depending upon the shape of the cam piece,the positioning of the cam piece can be made further reliable by the pressure of flow of the molten resin P.

As for the material of the resin molding 4 (and the material of the cam gear alike in the case of integral molding of the cam gear 6), use may be made of thermoplastic resins, such as polyamide (PA), polyacetal (POM), polyether sulfone (PES), polyether either ketone (PEEK), polyamide imide (PAI),polyetherimide (PEI), polyphenylene sulfide (PPS), and thermoplastic polyamide, and besides these, thermosetting resin, such as phenol resin, epoxy resin, and totally aromatic polyimide (PI). From the standpoints of easy molding, toughness, wear resistance, heat resistance, weather resistance, and cost, however, it is desirable to use polyamides (PA); polyamide 6, polyamide 6-6, and polyamide 4-6 are particularly desirable since they are superior in mechanical characteristics. The main characteristics of moldings of polyamide 6, polyamide 6-6, and polyamide 4-6 in the dry state and in the equilibrium water absorption state are as follows.

(1) Polyamide 6 (PA6)
Bending elasticity: $0.84–2.8\times10^4$ kgf/cm$^2$
Break elongation: 200%
Hardness: R88–R114 (Rockwell hardness)
Tensile Strength: 340–800 kgf/cm$^2$
Bending strength: 390–980 kgf/cm$^2$
Izod impact strength: 35–6 kgf·cm/cm (2) Polyamide 6-6 (PA6-6)
Bending elasticity: $1–2.7\times10^4$ kgf/cm$^2$
Break elongation: 50–100%
Hardness: R90–R118 (Rockwell hardness)
Tensile strength: 610–870 kgf/cm$^2$
Bending strength: 410–1070 kgf/cm$^2$
Izod impact strength: 26–6 kgf·cm/cm (3) Polyamide 4-6 (PA4-6)
Bending elasticity: $1.1–3.2\times10^4$ kgf/cm$^2$
Break elongation: 40–200%
Hardness: R91–R118 (Rockwell hardness)
Tensile strength: 600–1000 kgf/cm$^2$
Bending strength: 670–1440 kgf/cm$^2$
Izod impact strength: 18–9 kgf·cm/cm Further, glass fiber, carbon fiber, graphite, glass flake, and/or aromatic polyamide fiber may be added in suitable amount as a strengthening agent to said polyamide (nylon).

Polyamide resins are superior in impact resistance and have a suitable degree of surface hardness which, in turn, provides good wear resistance characteristics and self-lubricability. Polyamide 6 resin is superior in low water absorption and moldability; polyamide 4-6 resin is superior in mechanical strength characteristics and heat resistance, having a melting point of about 295° C.; and polyamide 6-6 is has characteristics intermediate between the two, which are desirable as a whole. Further, polyamide 6-6 resin has a melting point of about 250°–265° C. and is considered to be capable of withstanding thermal usage with general-purpose engines. In point of heat resistance, resins whose melting points are about 200° C. or above, preferably about 250° C. or above are considered to be relatively sufficient for use in the present embodiment. Further, polyamide resins are resistant to lubricating oil and are generally superior in bending elasticity, break elongation, hardness, tensile strength, bending strength, impact strength, heat characteristics, cost, and moldability owing to a suitable degree of viscosity in the molten state for injection molding, being considered to be preferable for use in general-purpose engines having a suitable degree of output.

On the other hand, if the bending strength, tensile strength, and hardness of a resin to be used are lower than the aforesaid values (physical characteristic values of various polyimides), it is expected that the strength characteristics in the tooth roots and tooth surface of the gear and the fixing strength of the cam piece are insufficient; if these are too low, it is considered to be difficult to withstand the shocks and vibrations produced by the engine in operation. Further if the Izod impact strength and break elongation are lower than said values, sufficient durability cannot be expected which withstands shocks and vibrations with respect to the fatigue strength characteristics and the fixing strength of the cam piece with repeated loads imposed on the tooth surface and tooth roots of the gear due to meshing; if these are too high, it is supposed that it is difficult to cope with the strength required by the gear and the fixing strength of the cam piece. If a resin material having such mechanical strength characteristics is used, it is believed that the durability of the tooth surface and tooth root of the gear and the strength characteristics of the fixing portions of the gear and cam piece are can be maintained even if loads such as the transmission torque are imposed.

As for the method of molding polyamide resin, there may be employed various molding methods such as compression molding, transfer molding, laminated molding, extrusion molding, and injection molding; however, it is preferable to employ injection molding, which enables an integrated unit of cam, cam gear and shaft to be molded relatively easily and which leads to improved operating efficiency and reduced cost. Further, polyamide resins are crystalline resins and their mechanical characteristics may be allowed to somewhat change through heat treatment after molding.

The cam piece 3 (3') may be molded by various molding methods such as casting, forging, machining, compression molding, powder metallurgy molding, but it is preferable to use a sintered molding method such as powder metallurgy molding, which ensures efficient molding. In this case, use may be made of a totally aromatic polyimide resin powder which is a thermosetting resin obtained by causing condensation reaction between pyromellitic acid dianhydride of tetracarbonic acid dianhydride and 4,4'-diaminodiphenyl-ether to form polyamide acid and closing the imide ring as by dehydration, or other aforesaid various resin powders, ceramic powder, and metal powders such as iron, copper, zinc, and nickel, or mixtures of these powders,or these powders having said strengthening agents added thereto, which provide improved vibration characteristics, durability, dimensional stability and moldability. Such fine powder is compression molded to form a compact body, which is then fired and subjected to a treatment for surface hardening, if necessary, whereby a cam piece can be molded.

It is considered that in operation the cam piece is always pressed against the tappet by the force of the valve spring while rotating and sliding with the load (P) and slide speed (V) varying and with impact forces applied thereto; thus, the cam piece is used under severe PV value usage conditions. Therefore, even with the polyamide resin used for the cam gear 6 in the embodiment, the usage including slide conditions differs between the cam piece and the gear, so that it is considered that the polyimide resin as such falls to provide the required durability, such as wear resistance, for the cam piece. However, in order to reduce, however little, the friction coefficient between the cam piece and the tappet and to improve wear resistance or in order to improve, however little, fuel consumption rate, it may be contemplated to use a material having self-lubricability, for example, a material consisting mainly of resin, so as to form a cam piece member. In this case, said thermosetting resin or the like may be used to withstand the heat from the engine and the heat of friction from frictional sliding between the cam piece and the tappet. If the highest wear resistance is taken into consideration, the aforesaid totally aromatic polyimide resin may be selected. Such thermosetting resins, especially totally aromatic polyimide resin, are superior in heat resistance, limit PV value, and mechanical characteristics. On the other hand, if a sintered ferrous alloy consisting mainly of ferrous powder and containing about 1–5% by weight of carbon can be used in the light of the specification or usage conditions including friction coefficient and wear resistance, it may be formed into a cam piece molding having suitable wear characteristics necessary for the cam piece. Further, these may be mixed with at least one or more of said various powders in substantially the same amount as said carbon content so as to improve slide characteristics, dimensional stability and moldability. As for the respective contents of these components, if the carbon content, for example, is too small, suitable mechanical strengths, such as hardness, cannot be obtained for the locking member, shaft, and cam piece, while if it is too large, wear resistance and the like cannot be expected. In addition, depending upon the specification and usage conditions of the engine, the locking member, shaft, and cam piece may or may not contain carbon and the like, and said hardening treatment may be omitted.

Figure 6A:
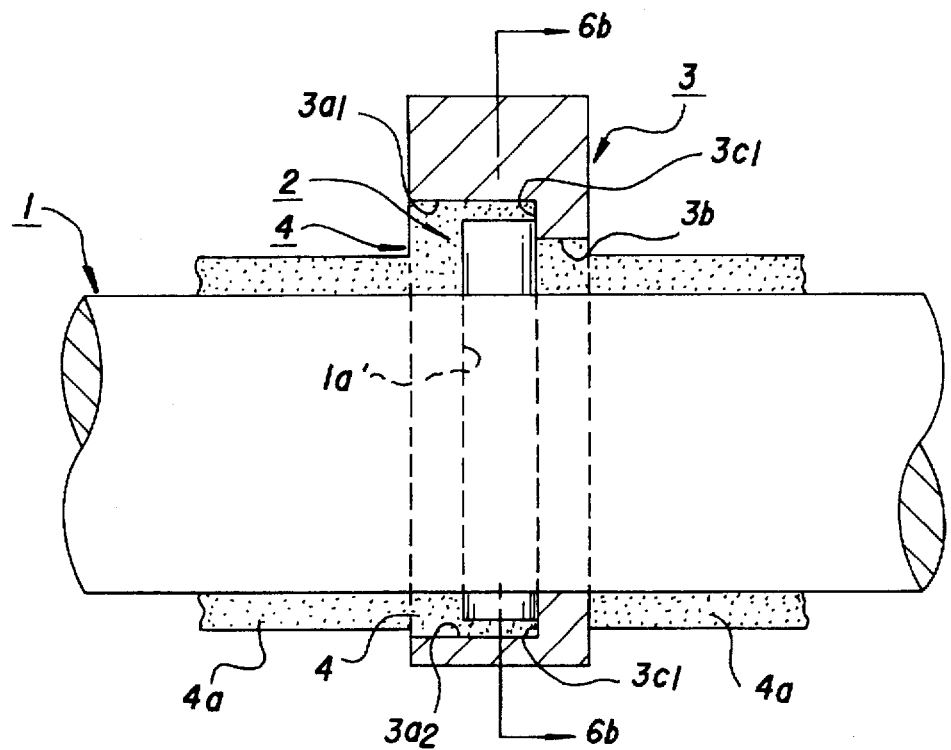
Figure 6B:
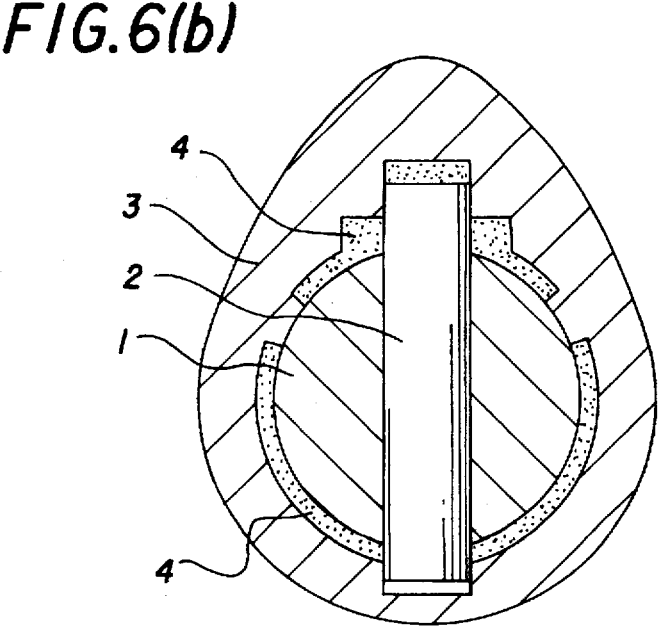

In an embodiment shown in FIG. 6, the fixing portions of a cam piece 3 comprising a locking member, a recess and a resin molding are circumferentially equispaced at two places.

In this embodiment also, a metal pin 2 is used to provide the locking member, which is fitted in a radially extending through-hole $1a'$ formed in the shaft 1 at a predetermined position. Therefore, in this, the opposite ends of the metal pin 2 projecting radially outward from the outer periphery of the shaft 1 serve the function of the locking member. The rest of the basic arrangement is the same as in the construction shown in FIGS. 1 through 3.

Figure 5A:
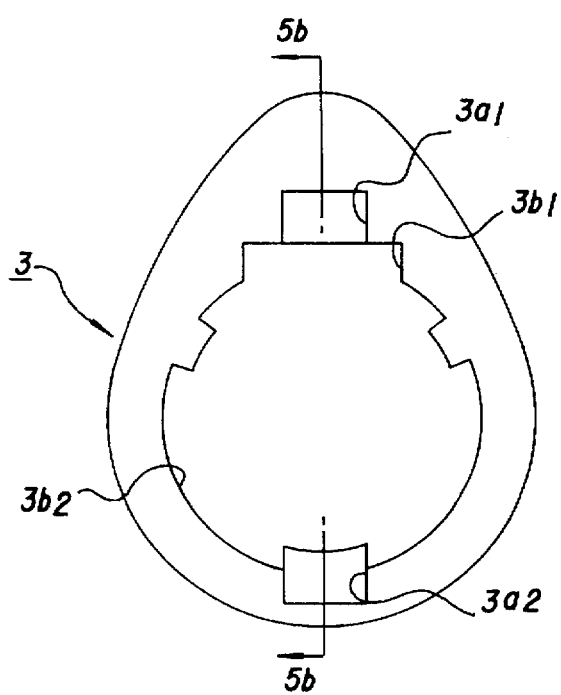
FIG. 5 is a front view (FIG. a) of the cam piece in FIG. 6, and a cross-sectional view (FIG. b) taken along the line b—b in FIG. 6.
Figure 5B:
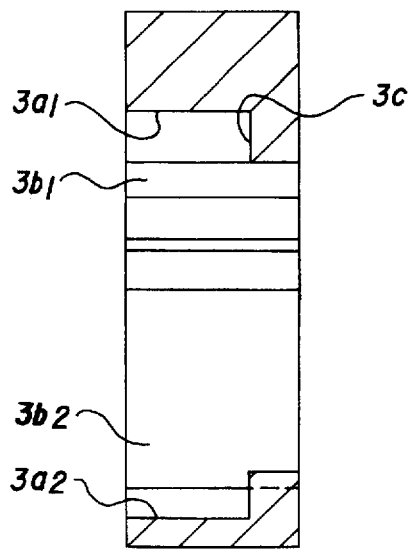

As shown in FIG. 5, the cam piece 3 is provided with square recesses $3a1$ and $3a2$ circumferentially equispaced at two places, and with clearances $3b1$ and $3b2$ axially extending from one end surface thereof to the other. The recess $3a1$ is positioned on the inner diameter side of the cam nose, while the recess $3a2$ is positioned diametrically opposite thereto. The recesses $3a1$ and the clearance $3b1$ communicate with each other, and so do the recess $3a2$ and the clearance $3b2$.

In fixing the cam piece 3 on the shaft 1, first the cam piece 3 is slid onto the shaft 1 until it reaches the position where the metal pin 2 is fitted. And the recesses $3a1$ and $3a2$ are fitted over the ends of the metal pin 2 and moved until the bottom walls $3c1$ and $3c2$ of the recess $3a1$ and $3a2$ abut against the metal pin 2. When the metal pin 2 has been thoroughly fitted in the recesses $3a1$ and $3a2$ in this manner, abutment between the bottom walls $3c$ of the recesses $3a1$, $3a2$ and the metal pin 2 determines the axial position of the cam piece 3 relative to the shaft 1, and at the same time abutment between the opposite walls of the recesses $3a1$, $3a2$ and the metal pin 2 determines the position of the cam piece 3 in the rotative direction relative to the shaft 1.

Then, the shaft 1 having the cam piece 3 (and the unillustrated cam piece 3') positioned thereon in the manner described above is set in the mold, and molten resin is charged in the spaces defined between the recesses $3a1$, $3a2$ of the cam piece 3 and the outer periphery of the shaft 1. When the charged molten resin solidifies to form a resin moldings 4, the cam piece 3 is fixed in position in the axial and rotative directions relative to the shaft 1.

Since the fixing portions of the cam piece 3 are provided at two circumferentially equispaced places, the fixing strength of the cam piece 3 is further increased as compared with the construction of the preceding embodiment. Further, transmission of torque from the shaft 1 to the cam piece 3 is further reliable. It goes without saying that the same effectiveness as in the preceding embodiment can be obtained. In addition, the number of places for the fixing portions of the cam piece 3 is not limited to two; the fixing portions may be provided at three or more circumferentially equispaced places.

In general-purpose engines for generators and weed cutting machines which are suitable objects of application of the cam shaft A of the embodiments described above, it is considered that greater important is placed on low speed torque, starting characteristics, and idle stability than on high output. Therefore, the side valve type (SV type) and overhead valve type (OHV) are often selected which have a small number of parts, are simple in construction, inexpensive and light in weight. The OHV type engine is of the type in which the cam shaft is disposed in the crankcase and the operating valves such as the suction valve and exhaust valve are driven through a push rod, in which respect it is considered to be a different type of engine from a high performance engine, such as the so-called overhead cam shaft type (OHC type) in which the cam shaft is mounted over the cylinder. In concrete, the OHV engine is designed to actuate the bush rod and rocker arm by the gear on the power output shaft through the cam shaft and actuate the valves positioned over the piston and cylinder of the engine; to this end, the cam shaft is disposed in the vicinity of the oil pan under the crankcase. Therefore, in such engine, the lubricating oil from the upper structure of the engine including the cylinder and moving valve flows to the lower structure and, depending upon the disposition of the oil passages, it is properly fed to the area where the cam gears mesh and the area where the cam and the tappet slide relative to each other, thereby reducing the friction force and wear. At the same time, since the temperature rise of these members is also suppressed, it is considered that relatively good durability can be secured the cam shaft 1, cam gear 6 and cam pieces 3, 3' even if they are integrated into a unit, such as the cam shaft A. Therefore, it is considered that the cam shaft A in this embodiment is suitable for an engine of the construction in which the cam shaft is disposed in the lower region rather than for the construction in which it is, disposed over the cylinder.

Further, the cam shaft A in this embodiment can be employed not only in a single cylinder engine but also for a multi-cylinder engine having two or three cylinders or more cylinders. Further, it may be employed in an engine having two or three moving valves or more moving valves per cylinder. Further, it may be employed not only in a gasoline engine but also in a Diesel engine.

In addition, the present invention is not limited to a cam shaft molded integrally with a cam gear but also to a cam gear formed of metal.

The invention has the following specific effects:

(1) By simply fitting the cam piece on the shaft with its recess fitted on the locking member, the positioning of the cam piece relative to the shaft in the axial and rotative directions can be accurately effected. Therefore, the positioning operation for the cam piece is simplified, making it possible to avoid the inconveniences in the prior construction, such as more sophistication of the mold than is necessary and complexity involved in splitting the mold due to the positioning being effected within the mold. Further, even if a cam piece differs in cam profile and phase angle, its positioning can be accurately effected using the same mold rather than changing the mold. Therefore, the invention is advantageous from the standpoints of mold design, manufacture, maintenance, setups and changeovers, and cost.

(2) Since transmission of torque from the shaft to the cam piece is effected through the area of contact between the locking member and the lateral walls of the recess, the torque transmission is further reliable as compared with the conventional construction in which it is effected through a resin molding.

(3) Since the provision of clearances in the cam pieces makes it possible to charge molten resin into the fixing portions of a plurality of cam pieces by simply providing one cavity and a gate in the mold, the mold construction is simplified and it is possible to dispense with the key way and spiral groove heretofore formed in order to obtain the flow of molten resin within the mold. As a result, it is possible to attain an increase in the shaft strength, an attendant reduction in the shaft diameter, simplification of the process, and a corresponding reduction in cost.

(4) Although the locking member may be integrally formed on the outer periphery of the shaft, the employment of the arrangement in which a metal pin is erected at a predetermined position on the shaft makes it possible to simplify the process.

(5) By providing the locking member, recess and fixing portions of resin molding at a plurality of circumferential positions, it is possible to improve the fixing strength and and increase transmission torque.

What is claimed is:

1. A cam fixing construction for a cam shaft comprising:

a shaft;

a locking member disposed at a predetermined position on said shaft;

a cam piece having a recess axially extending from one end surface to another end surface thereof, said cam piece having a passage axially extending from said one end surface to said other end surface, said recess having a bottom wall and opposite side walls, said recess and said passage communicating with each other, said cam piece being fitted on an outer peripheral surface of said shaft such that said locking member is firmly disposed in said recess;

a resin molding of a resin material formed into a space defined between said recess of said cam piece and said outer peripheral surface of said shaft and said locking member, said resin material filled into said space through said passage; and wherein said cam piece is fixed in position in the axial direction by engagements between said locking member and said bottom wall and between said locking member and said resin molding, and is fixed in the rotative direction by engagements between said locking member and said opposite side walls.

2. A cam fixing construction for a cam shaft as set forth in claim 1, wherein said locking member is a metal pin erected on said shaft at a predetermined position.

3. A cam fixing construction for a cam shaft as set forth in claim 1, wherein a plurality of said locking members are disposed rotatively at predetermined positions on said shaft, said cam piece has a plurality of said recesses and said passages corresponding to each of said locking members, and wherein said resin molding is formed into each space defined between said recesses of said cam piece and said outer peripheral surface of said shaft and said locking members.

4. A cam fixing construction for a cam shaft as set forth in claim 3, wherein said locking members are the opposite ends of a metal pin extending through and along a diameter of said shaft.

* * * * *